United States Patent
Offermann

(10) Patent No.: US 10,160,039 B2
(45) Date of Patent: Dec. 25, 2018

(54) APPARATUSES AND METHODS FOR TOOL HEIGHT SETTING

(71) Applicant: The Boeing Company, Chicago, IL (US)

(72) Inventor: John Herbert Offermann, Charleston, SC (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 14/995,940

(22) Filed: Jan. 14, 2016

(65) Prior Publication Data
US 2017/0203370 A1     Jul. 20, 2017

(51) Int. Cl.
*G01B 3/20* (2006.01)
*B23B 25/06* (2006.01)
*B23Q 17/22* (2006.01)

(52) U.S. Cl.
CPC ........ *B23B 25/065* (2013.01); *B23Q 17/2275* (2013.01); *B23B 2260/094* (2013.01)

(58) Field of Classification Search
CPC ............ B23B 2260/094; B23B 25/065; B23Q 17/2275
USPC .................................. 33/797, 799, 806–813
See application file for complete search history.

(56) References Cited

U.S. PATENT DOCUMENTS

| | | | | |
|---|---|---|---|---|
| 2,414,861 A | | 1/1947 | Evans | |
| 2,791,033 A | * | 5/1957 | Walters | G01B 5/08 33/799 |
| 3,407,504 A | * | 10/1968 | Burch | G01B 3/166 33/799 |
| 3,845,559 A | * | 11/1974 | Offer | G01B 3/20 33/613 |
| 3,869,801 A | * | 3/1975 | Lycan | G01B 3/20 33/645 |
| 4,399,613 A | * | 8/1983 | Nishikata | G01B 3/205 33/784 |
| 4,608,759 A | * | 9/1986 | Bowhay | G01B 3/20 33/796 |

(Continued)

OTHER PUBLICATIONS

Home Metal Shop Club newsletter (www.homemetalshopclub.org/news/12/newsletter1208.pdf), Aug. 2012, vol. 17, No. 8.

(Continued)

*Primary Examiner* — Yaritza Guadalupe-McCall
(74) *Attorney, Agent, or Firm* — Joseph F. Harding; The Small Patent Law Group LLC

(57) ABSTRACT

A height-setting tool is provided that includes a first clamping jaw, a second clamping jaw, an adjustment member, and an indicator member. The first clamping jaw includes a first clamping surface. The second clamping jaw is opposed to the first clamping jaw, and includes a second clamping surface. The first and second clamping jaws are configured to grasp a jaw of a chuck. The adjustment member is coupled to the first clamping jaw and second clamping jaw, and is configured such that a movement of the adjustment member moves the first and second clamping jaws by corresponding amounts in opposite directions. The indicator member includes an indicator surface. The indicator member is coupled to the adjustment member with the indicator surface equidistant from the first and second surfaces along a clamping direction.

20 Claims, 7 Drawing Sheets

(56) References Cited

U.S. PATENT DOCUMENTS

| | | | |
|---|---|---|---|
| 4,626,151 A | 12/1986 | Dietrich | |
| 4,682,420 A | 7/1987 | Teets | |
| 5,249,366 A * | 10/1993 | Takahashi | A61B 5/0053 33/512 |
| 5,317,814 A * | 6/1994 | Rogler | G01B 5/12 33/542 |
| 5,319,860 A * | 6/1994 | Pocci | G01B 5/08 33/542 |
| 5,430,954 A * | 7/1995 | Best | A61B 5/0053 33/784 |
| 6,105,269 A * | 8/2000 | Kondrat | A61B 5/4504 33/512 |
| 6,430,830 B1 * | 8/2002 | Segal | A61C 19/04 33/513 |
| 6,990,746 B2 * | 1/2006 | Penna | G01B 3/205 33/783 |
| 7,328,520 B2 * | 2/2008 | Galle, Sr. | G01B 5/08 33/783 |
| 7,509,754 B2 * | 3/2009 | Hu | G01B 3/166 33/783 |
| 7,681,325 B2 * | 3/2010 | Sassatelli | F01D 21/003 33/783 |
| 8,162,951 B2 * | 4/2012 | Kaufman | A61B 17/025 33/797 |
| 8,256,128 B2 * | 9/2012 | Kozykowski | G01B 5/24 33/534 |
| 8,826,557 B2 * | 9/2014 | Yang | G01B 3/20 33/609 |
| 2009/0056160 A1 * | 3/2009 | Hu | G01B 3/166 33/806 |
| 2014/0007445 A1 * | 1/2014 | Yang | G01B 3/20 33/811 |
| 2017/0203370 A1 * | 7/2017 | Offermann | B23B 25/065 |

OTHER PUBLICATIONS

<http://www.toolsandmods.com/lathe/mini-lathe-center-finder>; Jan. 14, 2016.
<http://www.sherline.com/latheins.htm>; Jan. 14, 2016.
<http://www.edgetechnologyproducts.com/pro-lathe-gage/>; Jan. 14, 2016.

* cited by examiner

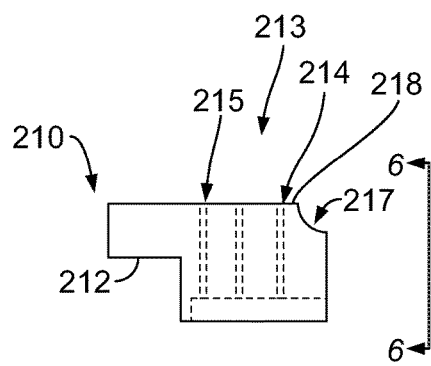
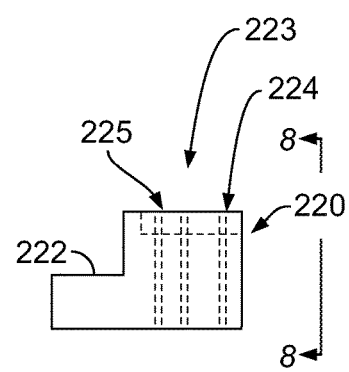
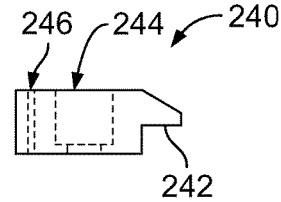
FIG. 5   FIG. 7   FIG. 9
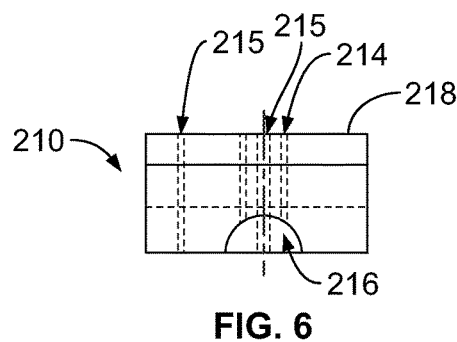
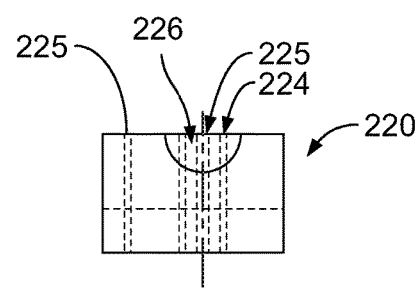
FIG. 6   FIG. 8
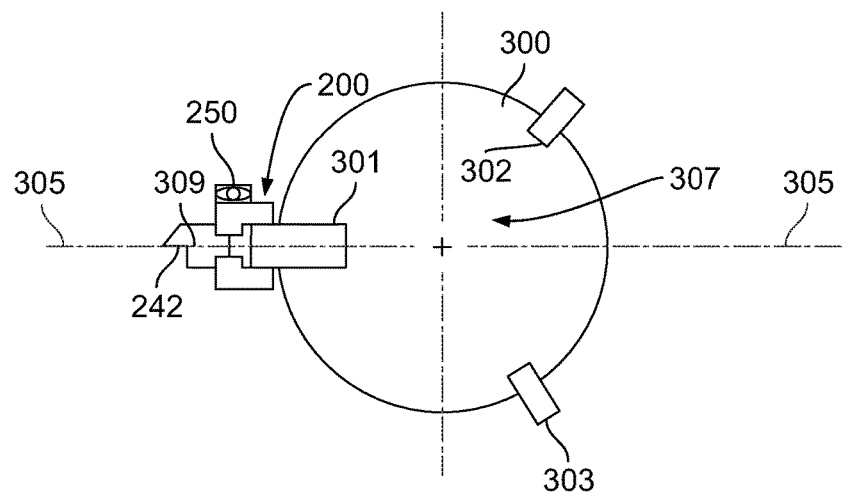
FIG. 10

APPARATUSES AND METHODS FOR TOOL HEIGHT SETTING

FIELD OF EMBODIMENTS OF THE DISCLOSURE

Embodiments of the present disclosure generally relate to height-setting tools, for example for setting the height of a cutting tool of a lathe.

BACKGROUND OF THE DISCLOSURE

Proper setting of the height of cutting tools on metal cutting lathes helps provide optimum cutter life and accuracy of desired dimensions. Current available height setting techniques, however, may be cumbersome, inconvenient, and/or impractical, for example, based on space available depending on tool design and/or a part being machined.

SUMMARY OF THE DISCLOSURE

Accordingly, improvement of setting a position (e.g., height) of a tool (e.g., a cutting tool) is provided in various embodiments disclosed herein.

Certain embodiments of the present disclosure provide a height-setting tool. The height-setting tool includes a first clamping jaw, a second clamping jaw, an adjustment member, and an indicator member. The first clamping jaw includes a first clamping surface. The second clamping jaw is opposed to the first clamping jaw, and includes a second clamping surface. The first and second clamping jaws are configured to grasp a jaw of a chuck. The adjustment member is coupled to the first clamping jaw and second clamping jaw, and is configured such that a movement of the adjustment member moves the first and second clamping jaws by corresponding amounts in opposite directions. The indicator member includes an indicator surface. The indicator member is coupled to the adjustment member with the indicator surface equidistant from the first and second surfaces along a clamping direction.

Certain embodiments of the present disclosure provide a method. The method includes coupling a first clamping jaw and a second clamping jaw to an adjustment member. The first clamping jaw includes a first clamping surface. The second clamping jaw is opposed to the first clamping jaw, and includes a second clamping surface. The first and second clamping jaws are configured to grasp a jaw of a chuck. The adjustment member is coupled to the first clamping jaw and second clamping jaw. A movement of the adjustment member moves the first and second clamping jaws by corresponding amounts in opposite directions. The method also includes coupling the adjustment member to an indicator member. The indicator member includes an indicator surface. Also, the method includes positioning the indicator surface at a predetermined relationship relative to the first and second clamping surfaces.

Certain embodiments of the present disclosure provide a method. The method includes affixing a tool to a jaw of a chuck. The tool includes first and second clamping jaws configured to grasp the jaw of the chuck. The first and second clamping jaws are coupled to an adjustment member, and the adjustment member is coupled to an indicator member. The method also includes rotating the jaw of the chuck to a position at which an indicator surface of the indicator member aligns with a reference line. Further, the method includes setting a cutting tool to a height indicated by the indicator surface.

BRIEF DESCRIPTION OF THE DRAWINGS

FIG. 5 provides a side view of a first clamping jaw of the height-setting tool of FIGS. 2-4.

FIG. 6 provides a front view of a first clamping jaw of the height-setting tool of FIGS. 2-4.

FIG. 7 provides a side view of a second clamping jaw of the height-setting tool of FIGS. 2-4.

FIG. 8 provides a front view of a second clamping jaw of the height-setting tool of FIGS. 2-4.

FIG. 9 provides a side view of an indicator member of the height-setting tool of FIGS. 2-4.

FIG. 10 provides a front view of the height-setting tool of FIGS. 2-4 in position on a jaw of a chuck.

DETAILED DESCRIPTION OF THE DISCLOSURE

Figure 1:
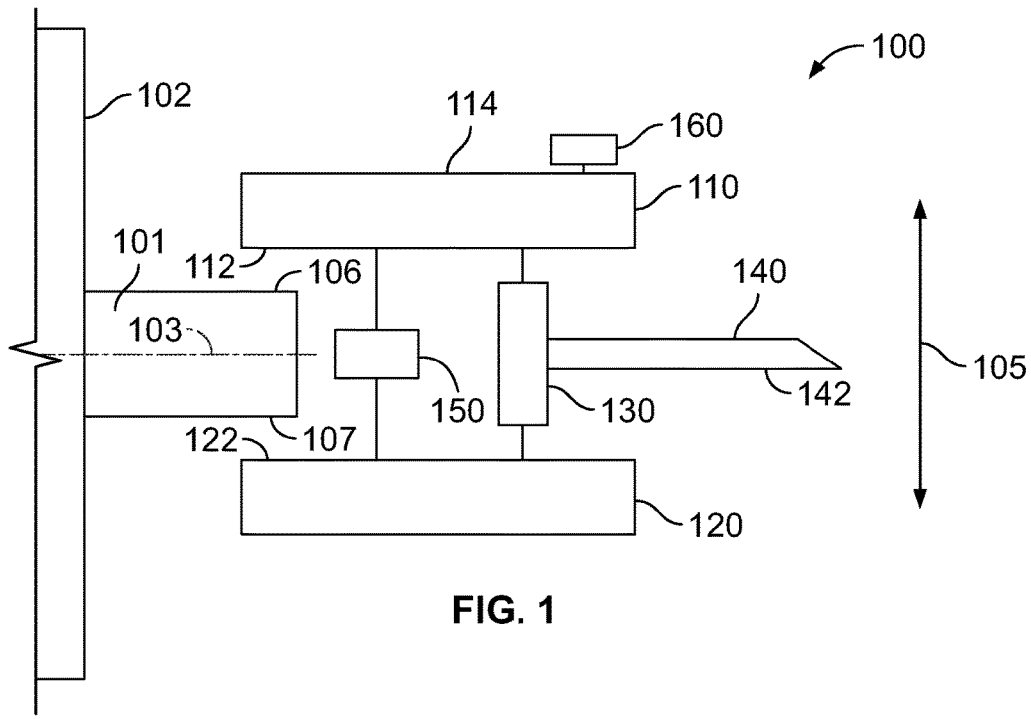
FIG. 1 provides a schematic block view of a height-setting tool in accordance with various embodiments.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for setting a tool height, for example for setting a height of a cutting tool of a lathe. For example, on an engine lathe, a workpiece holding chuck may be a precision made round shape that is concentric to a spindle that rotates in either direction located at 90 degrees from a bed of the lathe. The chuck may have slots that accept jaws, with the jaws precision machined at exact degrees of angles apart from each other (for example, evenly spaced circumferentially about the axis of the spindle).

In various embodiments, a height-setting tool is configured to be mounted or secured to one of the jaws of the chuck. When one of the jaws to which the height-setting tool is mounted is rotated to a level position or parallel to the bed of the lathe, a center line of the jaw defined at half of the jaw's thickness will be level with or aligned with the center line of the spindle, which also defines a height at which a cutting tool is to be set. Various embodiments provide a level for quick, accurate, and convenient determination of when the chuck jaw is at the level or desired position for setting the height of the cutting tool (e.g., a level indication may be provided when the indicator surface of the height-setting tool is level with the center line of the spindle, and a cutting surface may be placed in contact with the indicator surface to set the height of the cutting tool).

The height-setting tool in various embodiments includes an indicator surface used to set the height of the cutting tool. For example, after the height-setting tool is initially assembled, the height-setting tool may be clamped on to a fixture, and the indicator surface may be precisely machined to correspond to or align with a center line of the clamping jaws of the height-setting tool (and a center line of a chuck to which the clamping jaws are to be secured). For example, the fixture may have a reference line or surface corresponding to a center line of the fixture, and the indicator surface may be machined to be level and aligned with the reference line or surface.

Various embodiments may provide for improved setting of height of cutting tools. For example, various embodiments may provide a flexible height-setting tool that may be used interchangeably with differently sized chuck jaws. Various embodiments may provide a versatile height-setting tool that may be use with various tool design and space limitations. Various embodiments may provide for accurate, reliable setting of cutting tool height. Various embodiments may provide quick, convenient setting of cutting height. Various embodiments may provide a height-setting tool that may be utilized with or without a workpiece retained in a chuck.

FIG. 1 provides a block schematic view of a height-setting tool 100 in accordance with various embodiments. As seen in FIG. 1, the height-setting tool 100 includes a first clamping jaw 110, a second clamping jaw 120, an adjustment member 130, and an indicator member 140. The depicted height-setting tool 100 is configured to be used in setting the height of a cutting tool used to cut a workpiece secured in jaws of a chuck (e.g., a cutting tool to be used in conjunction with a lathe having a series of evenly spaced jaws disposed on a chuck driven by a motor). The lathe may define a center line about which a workpiece being processed with the lathe is rotated. In the illustrated embodiment, a single jaw 101 of a chuck 102 is shown. Generally, the height-setting tool 100 is configured to grasp the jaw 101 or to clamp on to the jaw 101, and to be used to set the height of a cutting tool.

In the embodiment depicted in FIG. 1, the first clamping jaw 110 includes a first clamping surface 112, and the second clamping jaw 120 includes a second clamping surface 122. The second clamping jaw 120 is opposed to the first clamping jaw 110, with the first clamping surface 112 and second clamping surface 122 oriented toward each other. The first clamping jaw 110 and the second clamping jaw 120 are configured to grasp the jaw 101 of the chuck 102. In the illustrated embodiment, the first clamping surface 112 may be urged against an upper surface 106 of the jaw 101 while the second clamping surface 122 is urged against a lower surface 107 of the jaw 101 to grasp the jaw 101 between the first clamping surface 112 and the second clamping surface 122. The clamping surfaces (e.g., first clamping surface 112 and second clamping surface 122) are shaped to correspond or be complementary to corresponding surfaces of the jaw (e.g., upper surface 106 and lower surface 107, respectively) such that the clamping jaws may securely grasp the jaw with the clamping surfaces aligned with corresponding surfaces of the jaw.

The depicted first clamping jaw 110 and second clamping jaw 120 are articulated via the adjustment member 130. The illustrated adjustment member 130 is coupled to the first clamping jaw 110 and the second clamping jaw 120. For example, the adjustment member 130 may include threaded portions that are accepted by threaded openings of the first clamping jaw 110 and the second clamping jaw 120. As another example, the adjustment member 130 may include one or more linkages that are pinned or otherwise mounted to the first clamping jaw 110 and the second clamping jaw 120. Additionally or alternatively, the adjustment member 130 may include guides, rails, or the like that are configured to cooperate with one or more aspects of the first clamping jaw 110 and/or the second clamping jaw 120.

Further, the adjustment member 130 is configured such that a movement of the adjustment member 130 moves the first clamping jaw 110 and the second clamping jaw 120 by corresponding amounts in opposite directions. For example, a given movement of the adjustment member 130 may move the first clamping jaw 110 downward as seen in FIG. 1 along clamping direction 105 by a first amount, and also move the second clamping jaw 120 upward as seen in FIG. 1 along the clamping direction 105 by the same first amount, to urge the first clamping jaw 110 and the second clamping jaw 120 toward the jaw 101 of the chuck 102 to secure the height-setting tool 100 to the jaw 101. Similarly, a different movement (e.g., a rotation in an opposite direction) of the adjustment member 130 may move the first clamping jaw 110 upward as seen in FIG. 1 along clamping direction 105 by a second amount, and also move the second clamping jaw 120 downward as seen in FIG. 1 along the clamping direction 105 by the same second amount, to urge the first clamping jaw 110 and the second clamping jaw 120 away from the jaw 101 of the chuck 102 to release the height-setting tool 100 from the jaw 101, while maintaining the indicator member 140 (or a portion thereof) at a predetermined location between the first clamping surface 112 and the second clamping surface 122. For example, an indicator surface 142 of the indicator member 140 may be maintained equidistant along the clamping direction 105 between the first clamping surface 112 and the second clamping surface 122, thereby maintaining the indicator surface 142 at a centered position between the clamping jaws (and along a center line of any chuck jaw clamped between the first and second clamping members), allowing the height-setting tool 100 to be used with a variety of chuck jaw sizes.

In some embodiments, the adjustment member 130 may include threaded portions that are of the same pitch but oriented in different directions (e.g., a right-hand thread for use with one of the first clamping jaw 110 or the second clamping jaw 120, and a left-hand thread for use with the other of the first clamping jaw 110 or the second clamping jaw 120). Accordingly a rotation of the adjustment member 130 may result in equal but opposite movements of the first clamping jaw 110 and second clamping jaw 120 along the clamping direction 105. Alternatively, for example, the adjustment member 130 may include a central gear or pinion that cooperates with first and second racks on opposite sides of the pinion, with the first rack associated with the first clamping jaw 110 and the second rack associated with the second clamping jaw 120, such that rotation of the pinion results in equal but opposite linear translation of the racks and associated clamping jaws along the clamping direction 105. As one more example, a scissors- or bellows-type linkage or other linkage may be utilized to articulate the clamping jaws equal but oppositely directed amounts responsive to an input to the linkage.

As seen in FIG. 1, the height-setting tool 100 also includes an indicator member 140. The indicator member 140 includes an indicator surface 142. The indicator member 140 is coupled to the adjustment member 130 with the indicator surface 142 equidistant from the first surface 112 of the first clamping member 110 and the second surface 122 of the second clamping member 120 along the clamping direction 105. Accordingly, when the height-setting tool 100 is secured to the jaw 101 (e.g., with the jaw 101 firmly grasped between the first surface 112 and the second surface 122), the indicator surface 142 is disposed along a center-line defined by the jaw 101 and/or chuck 102. Thus, the jaw 101 may be understood as being disposed symmetrically about a line defined by the indicator surface 142 normal to the clamping direction 105 when the jaw 101 is secured in the height-setting tool 100. In some embodiments, the indicator member 140 and indicator surface 142 may include a ledge or other datum that cooperates with a corresponding feature of the adjustment member 130 to position the indicator surface 142 at a desired position with respect to the first clamping jaw 110 and second clamping jaw 120 (e.g., equidistant from the first surface 112 and the second surface 122 along the clamping direction 105). When the height-setting tool 100 is secured to the jaw 101, and the center line 103 of the jaw 101 is positioned along the center line of the chuck 102 or lathe to which the chuck 102 is mounted, the indicator surface 142 is also at the center line of the lathe (as the indicator surface 142 is equidistant from the jaw surfaces and thus along the center line 103 of the jaw 101). Accordingly, a cutting tool may be positioned abutting or in contact with the indicator surface 142 to position the cutting tool along the center line of the lathe.

In some embodiments, the indicator member 140 may first be mounted to the adjustment member 130, and the adjustment member 130 in turn mounted to the first clamping jaw 110 and the second clamping jaw 120. Then, after mounting the indicator member 140, the indicator surface 142 may be finally positioned with respect to the first clamping member 110 and the second clamping member 120. For example, the indicator surface 142 may be machined to a desired position with respect to the first clamping member 110 and the second clamping member 120. As another example, the indicator surface 142 may be adjustably mounted to the indicator member 140 and adjusted to the desired position with respect to the first clamping member 110 and the second clamping member 120.

The illustrated height-setting tool 100 also includes guides 150. The guides 150 are coupled to the first clamping jaw 110 and the second clamping jaw 120. The guides 150 are configured to prevent the first clamping jaw 110 and the second clamping jaw 120 from rotating (e.g., about an axis parallel to or along the clamping direction 105) when the first clamping jaw 110 and the second clamping jaw 120 are articulated with respect to each other via the adjustment member 130. For example, the guides 150 may include dowel pins that are press fit (or otherwise secured) into one of the first clamping jaw 110 or the second clamping jaw 120, and loosely fit into the other of the first clamping jaw 110 or the second clamping jaw 120.

The depicted height-setting tool 100 also includes a level 160. In the illustrated embodiment, the level 160 is mounted to the first clamping jaw 110. In other embodiments, the level 160 may be mounted to the second clamping jaw 120. The level 160 is mounted to the height-setting tool 100 such that the indicator surface 142 is aligned with a center line of the chuck 102 (and a lathe to which the chuck 102 is mounted) when the height-setting tool 100 is mounted to the jaw 101 of the chuck 102 and the level 160 indicates a level state. In some embodiments, the level 160 may be mounted to an upper surface 114 of the first clamping jaw 110 that is parallel to the first surface 112 and the center line 103 of the jaw 101, with the indicator surface 142 equidistant along the clamping direction 105 from the first surface 112 and the second surface 122 or otherwise aligned with the center line 103 of the jaw 101 when the height-setting tool 100 is secured to the jaw 101. For example, if the upper surface 106 and lower surface 107 are parallel to the center line 103 of jaw 101, the center line 103 of the jaw 101 (and the indicator surface 142) will be at the center line of the chuck 102 (and lathe) when a level reading is provided. Accordingly, when a level reading is achieved, the jaw 101 may be maintained in position with the level reading provided, and the cutting tool may be set using the indicator surface 142. For example, a cutting surface may be brought into contact with or otherwise abutting the indicator surface to be placed in a centered position, and the cutting tool set at the centered position.

The level 160, for example, may be a bubble level that utilizes a bubble of air in a tube partially filled with a liquid to visually indicate a level state. Use of a bubble level provides for convenient, reliable reading by an operator setting a tool height. It may be noted that the level 160 in still other embodiments may not be permanently mounted to either clamping jaw, but instead placed by hand or otherwise temporarily mounted during positioning of the chuck 102 to align the jaw 101 with a reference line (e.g., with a center line of the chuck 102 or lathe to which the chuck 102 is mounted). In various embodiments, precision height gauges may be used additionally or alternatively to a bubble level. Further, it may be noted that, in alternate embodiments, the indicator surface may be positioned at a reference level that is offset from the lathe or chuck center line, with a cutting surface of a cutting tool offset a similar distance from the indicator surface to position the cutting tool at a centered position.

Figure 2:
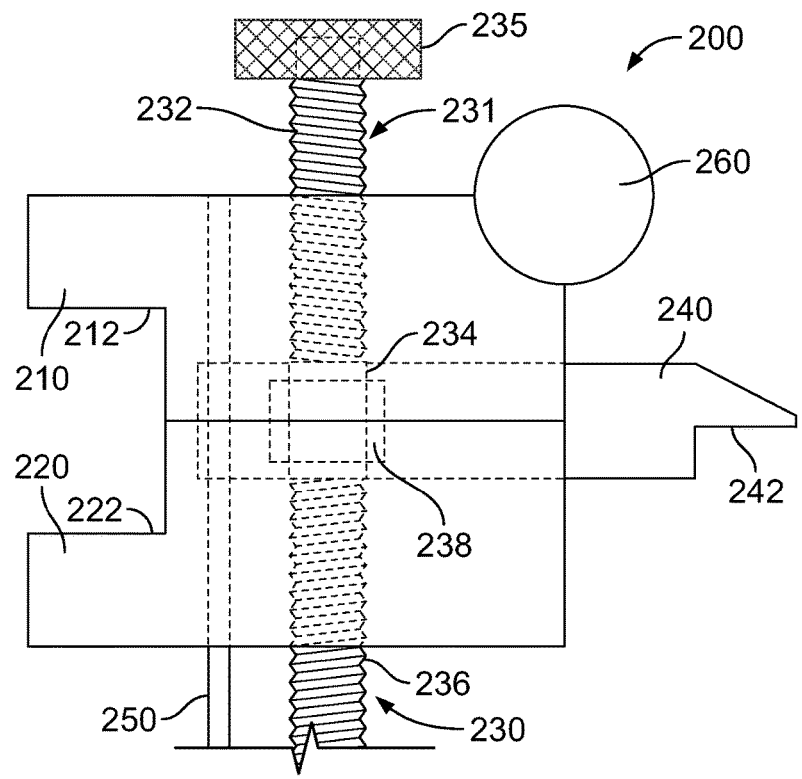
FIG. 2 provides a side view of a height-setting tool in accordance with various embodiments.
Figure 3:
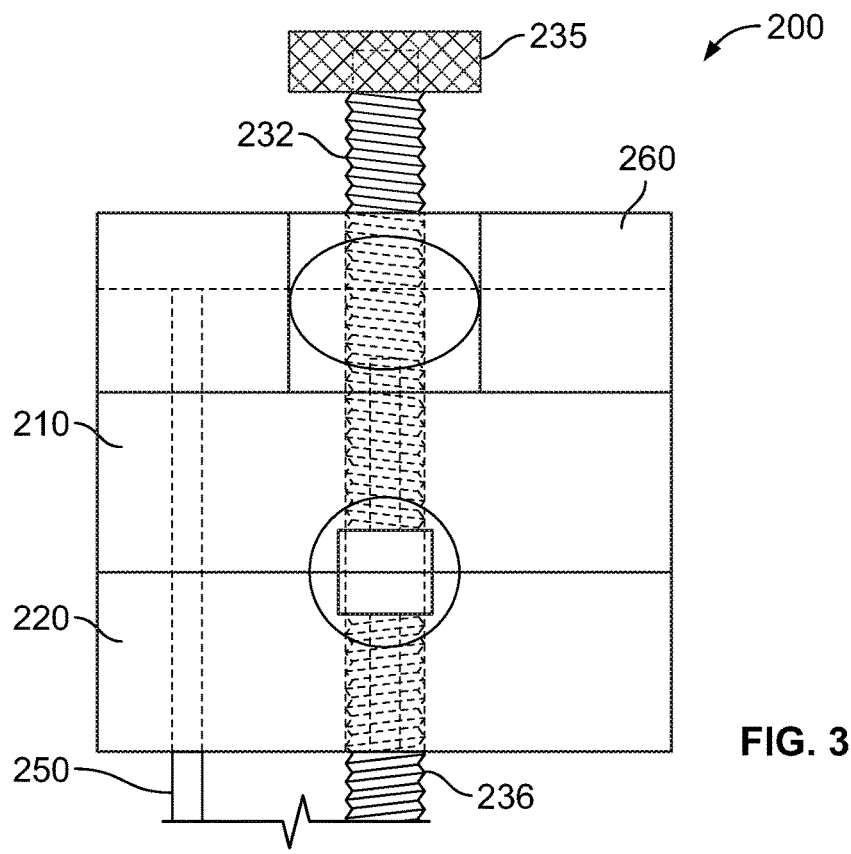
FIG. 3 provides a front view of the height-setting tool of FIG. 2.
Figure 4:
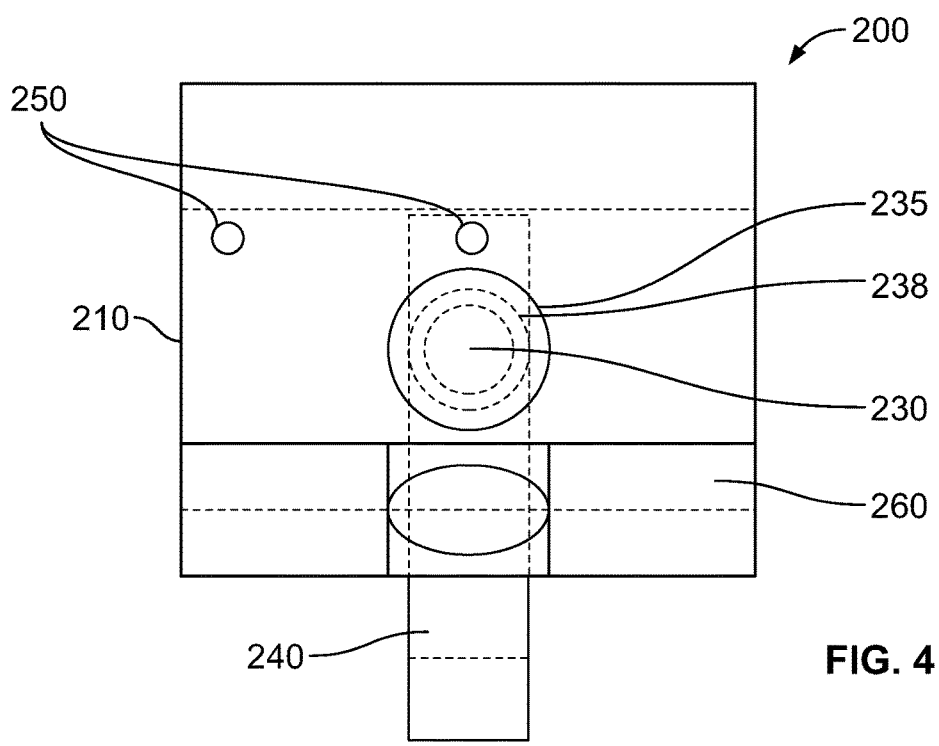
FIG. 4 provides a top plan view of the height-setting tool of FIGS. 2 and 3.

FIGS. 2-4 provide side, front, and top views, respectively, of a height-setting tool 200 that utilizes a threaded rod to articulate clamping jaws of the height-setting tool 200. In various embodiments, the height-setting tool 200 (and/or aspects thereof) may be generally similar in various respects to the height-setting tool 100 and/or variations thereof discussed herein. As seen in FIGS. 2-4, the height-setting tool 200 includes a first clamping jaw 210, a second clamping jaw 220, an adjustment member 230, a bearing 238, an indicator member 240, guides 250, and a level 260. The adjustment member 230 is configured to articulate the first clamping jaw 210 and the second clamping jaw 220 to grasp a jaw (e.g., jaw 101) of a chuck (e.g., chuck 102) of a lather, while the indicator member 240 is configured to provide a reference surface for setting the height of the tool (e.g., by positioning a cutting surface of the tool at a reference surface of the indicator member 240 when the jaw of the chuck is at a position corresponding to a center line of the lathe).

FIG. 5 provides a side view of the first clamping jaw 210, and FIG. 6 provides a front view of the first clamping jaw 210 (as seen from line 6-6 of FIG. 5). The first clamping jaw 210 includes a first surface 212 configured to contact a surface of a jaw (e.g., jaw 101) when the height-setting tool 200 is secured to the jaw. As best seen in FIGS. 2 and 5, the first surface 212 is offset from a central portion 213. The central portion 213 includes threaded opening 214 and guide openings 215. The threaded opening 214, for example, may include right hand threads for accepting a threaded portion of the adjustment member 230. The guide openings 215 are configured to accept the guides 250. In the depicted embodiment, the guide openings 215 are sized to accept the guides 250 with a press-fit. The first clamping jaw 210 also includes a cutout 216 for providing clearance for the indicator member 240. Further, the first clamping jaw 210 includes a cutout 217 on an upper surface 218 configured for mounting of the level 260. The level 260 may be mounted to provide a level indication when the upper surface 218 is level or parallel to the horizon, and the upper surface 218 may be parallel to the center line of the height-setting tool 200 and a chuck jaw to which the height-setting tool 200 is mounted. Accordingly, the level 260 may provide a level indication when the center line of the height-setting tool is level and aligned with the center line of a lathe.

FIG. 7 provides a side view of the second clamping jaw 220, and FIG. 8 provides a front view of the second clamping jaw 220 (as seen from line 8-8 of FIG. 7). The second clamping jaw 220 includes a first surface 222 configured to contact a surface of a jaw (e.g., jaw 101) when the height-setting tool 200 is secured to the jaw. As best seen in FIGS. 2 and 7, the second surface 222 is offset from a central portion 223. The central portion 223 includes threaded opening 224 and guide openings 225. The threaded opening 224, for example, may include left hand threads for accepting a threaded portion of the adjustment member 230. The guide openings 225 are configured to accept the guides 250. In the depicted embodiment, the guide openings 215 are sized to accept the guides 250 with a slip fit. The second clamping jaw 220 also includes a cutout 226 for providing clearance for the indicator member 240.

As seen in FIGS. 2-4, the adjustment member 230 includes a threaded rod 231 and a knob 235. The threaded rod 231 includes an intermediate portion 234 disposed between a first threaded portion 232 and a second threaded portion 236. The first threaded portion 232 is configured to be accepted by the first clamping jaw 210 (e.g., by threaded opening 214), and the second threaded portion 236 is configured to be accepted by the second clamping jaw 220 (e.g., by threaded opening 224). The first threaded portion 232 and the second threaded portion 236 have threads of similar pitch but opposite sense or direction. For example, the first threaded portion 232 may have a right hand thread and the second threaded portion 236 may have a left hand thread. Accordingly, by rotation of the adjustment member 230 (e.g. by turning the knob 235), the threads of the first and second threaded portions act to move the first clamping jaw 220 and the second clamping jaw 230 the same amount but in opposite directions. Accordingly, if the indicator member 240 (e.g., indicator surface 242) is positioned in a desired centered position between the first and second clamping jaws when the jaws are in a first position, the indicator member 240 will remain in the desired centered position as the first and second clamping jaws are urged toward or away from each other.

The intermediate portion 234 of the illustrated embodiment is precisely machined to be accepted by an inner race of the bearing 238. The bearing 238 is utilized to maintain the adjustment member 230 (and, accordingly, the first clamping jaw 210 and second clamping jaw 220 which are mounted to the adjustment member 230) in a desired spatial relationship with the indicator member 240. The bearing 238 is configured to accept the intermediate portion 234 and to be press-fit into the indicator member 240.

FIG. 9 provides a side view of the indicator member 240. As seen in FIG. 9, the indicator member 240 includes an indicator surface 242, a bore 244, and opening 246. The bore 244 is configured to accept an outer race of the bearing 238 (e.g., with a press fit) to secure the bearing 238 in spatial relation to the indicator surface 242. The opening 246 is configured to accept one of the guides 260 (e.g., with a slip fit).

The guides 260 in the illustrated embodiment are configured as dowel pins. The dowel pins 260 are configured to be accepted in an aligned position by the corresponding openings of the first clamping jaw 210, the second clamping jaw 220, and the indicator member 240. In the illustrated embodiment, the dowel pins 260 are sized to allow for sliding of the dowel pins 260 relative to the indicator member 240 and second clamping jaw 220 due to a slip fit. The dowel pins 260 are positioned to prevent rotation of the first clamping jaw 210, the second clamping jaw 220, and the indicator member 240 with respect to each other when the adjustment member 230 is rotated.

FIG. 10 provides a front view of the height-setting tool 200 in position on a jaw of a chuck 300. The illustrated chuck 300 includes a first jaw 301, a second jaw 302, and a third jaw 303 equally spaced radially about an axis of rotation of the chuck 300. A workpiece securement region 307 is disposed radially inward of the jaws 301, 302, 303. The jaws 301, 302, 303 may be configured generally similar in various respects to the jaw 101. In the illustrated embodiment, the height-setting tool 200 is affixed or secured to the first jaw 301. As the height-setting tool 200 is mounted to the first jaw 301 radially outward of the workpiece securement region 307, the height-setting tool 200 may be secured to and/or released from the jaw 301 either with the workpiece secured by the jaws of the chuck 300, or with the workpiece released from the chuck 300. It may be noted that, in other embodiments, the height-setting tool 200 may be disposed at a more radially inward position, and the workpiece may be removed from the chuck 300 when setting a cutting tool height.

As seen in FIG. 10, the indicator surface 242 is aligned with the center line 309 of the jaw 301. Accordingly, when the center line 309 of the jaw 301 is aligned with the center line 305 of the chuck 300 (and lathe to which the chuck 300 is mounted), the indicator surface 242 is aligned with the center line 305 of the chuck 300 (and lathe), and may be used as a reference surface for positioning a cutting tool. As discussed herein, the alignment of the indicator surface 242 and center line 309 of the jaw 301 with the center line 305 of the chuck 300 may be indicated by a level indication from the level 250. For example, the height-setting tool 200 may be affixed to the jaw 301. With the height-setting tool 200 affixed to the jaw 301, the chuck 300 (and jaw 301) may be rotated until a level indication is provided, indicating the center line 305 of the jaw 301 and indicator surface 242 are aligned with the center line 309 of the chuck 300 and lathe. Then, with the indicator surface 242 aligned with the center line 309, a cutting surface of a cutting tool may be brought to a height defined by the indicator surface 242 to set the cutting tool height appropriately with respect to the center line 309 of the lathe (e.g., with a cutting surface level with or aligned with the center line 309).

Figure 11:
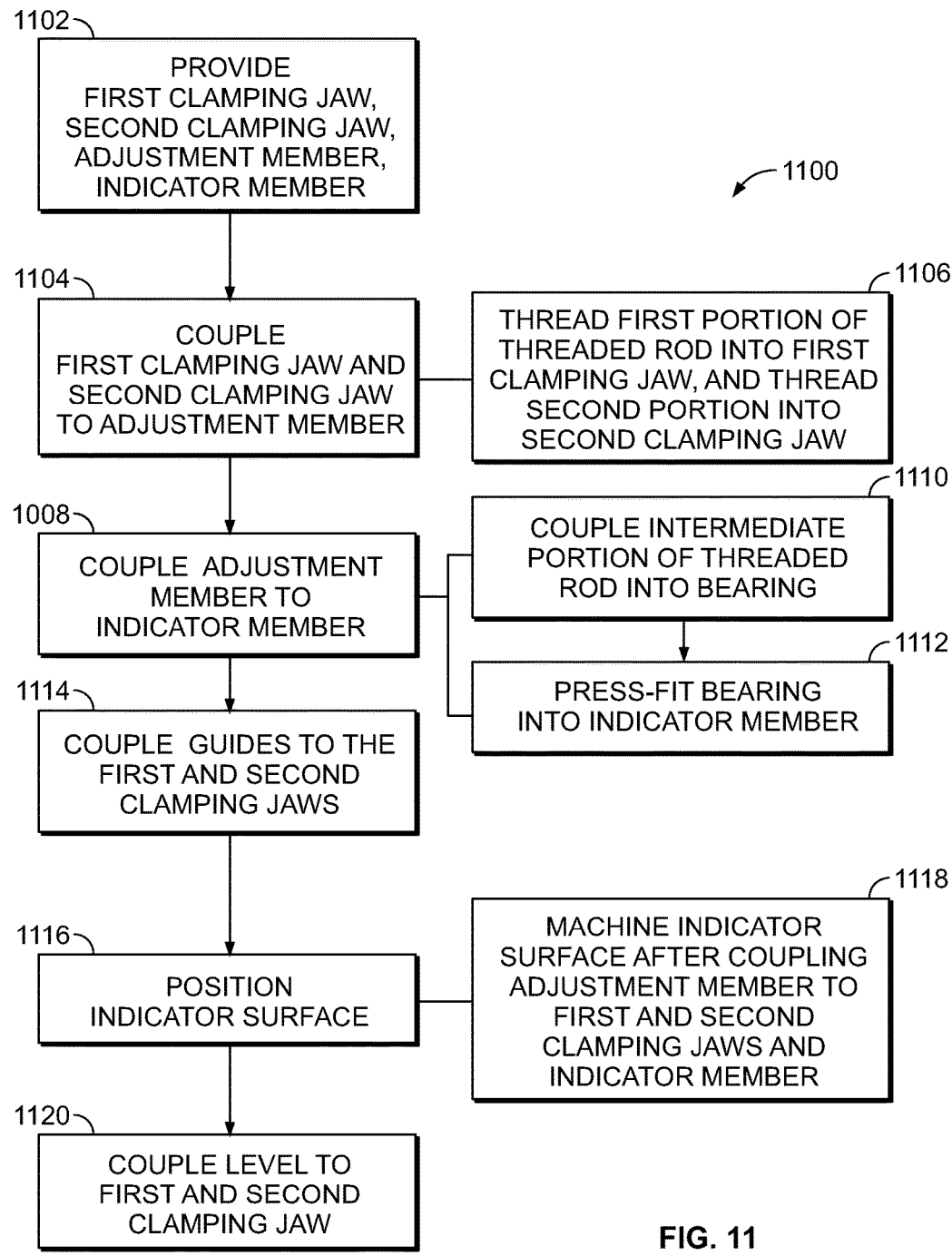
FIG. 11 provides a flowchart of a method according to an embodiment of the present disclosure.

FIG. 11 provides a flowchart of a method 1100 (e.g., for providing a height-setting tool (e.g., height-setting tool 100; height-setting tool 200)), in accordance with various embodiments. The method 1100, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 1102, a first clamping jaw (e.g., 110, 210), second clamping jaw (e.g., 120, 220), adjustment member (e.g., 130, 230), and indicator member (e.g., 140, 240) are provided. The various components provided at 1102 may be generally similar in respects to the first clamping jaw, second clamping jaw, adjustment member, and/or indicator member discussed herein in connection with various embodiments.

At 1104, the first clamping jaw and second clamping jaw are coupled to the adjustment member. The first and second clamping jaws may include first and second clamping surfaces, respectively, and be configured to grasp a jaw of a chuck between the first and second clamping surfaces. In the depicted embodiment, the adjustment member is coupled to the first clamping jaw and the second clamping jaw such that a movement of the adjustment member moves the first and second clamping jaws by corresponding amounts in opposite directions. For example, the first clamping jaw may be moved upward along a clamping direction while the second clamping jaw is moved downward along the clamping direction by an identical amount. In some embodiments, at 1106, the adjustment member may be coupled to the first and second clamping jaws by threading a first threaded portion of the adjustment member into the first clamping jaw and threading a second threaded portion of the adjustment member into the second clamping jaw. The first threaded portion and second threaded portion may have similar pitch but be oriented in opposite directions (e.g., one being a right-handed thread and the other being a left-handed thread).

At 1108, the adjustment member is coupled to the indicator member. The indicator member includes an indicator surface (e.g., 242), which may be configured for use in setting a tool height. In some embodiments, coupling the adjustment member to the indicator member may include, at 1110, coupling an intermediate portion (234) of a threaded rod of the adjustment member to a bearing, and, at 1112, press-fitting the bearing into the indicator member.

In the illustrated embodiment, at 1114, guides are coupled to the first and second clamping jaws. For example, the guides may be dowel pins accepted by openings of the first and second clamping jaws, and coupling the guides to the clamping jaws may include inserting the dowel pins into openings of the first and clamping jaws. One or more guides may also be accepted by an opening (or openings) of the indicator member. Generally, in various embodiments, the guides may be used to constrain the motion of the first and second clamping jaws with respect to each other to only motion in a desired direction. For example, the guides may be configured to allow lateral translation of the first and second clamping jaws while preventing rotation of the first and second clamping jaws relative to each other.

At 1116, the indicator surface of the indicator member is positioned at a predetermined relationship relative to the first and second clamping surfaces. For example, where a center line (e.g., 103) of a chuck jaw (e.g., 101) to which the height-setting tool is configured to be secured aligns with a center line of a lathe when the chuck jaw is in a centered position, the indicator surface may be positioned equidistant (e.g., along a clamping direction) from the first and second surface. As another example, where the center line of the chuck jaw is offset by a given distance from the center line of the lathe when the chuck jaw is in a centered position, the indicator surface may be offset a corresponding distance from the center line defined equidistant from the first and second clamping surfaces. In some embodiments, at 1118, the indicator surface is machined (e.g., to a predetermined relationship to the first and second clamping jaws, such as equidistant from first and second clamping surfaces of the first and second clamping jaws, respectively) after coupling the adjustment member to the indicator member, first clamping jaw, and second clamping jaw. For example, the first and second clamping jaws may be clamped on to a fixture using the adjustment member, and the indicator surface machined to align with a center line of the clamping jaws and/or fixture.

At 1120, a level (e.g., level 160, level 260) is coupled to at least one of the first clamping jaw or the second claiming jaw. The indicator surface is configured to be aligned with a center lien of the chuck when the height-setting tool is mounted to the jaw of the chuck and the level indicates a level state. The level, for example, may be a bubble level, and in various embodiments is mounted or otherwise disposed on a surface (e.g., an upper surface of the first clamping jaw) that is parallel to the center line of a chuck and/or lathe when the height-setting tool is secured to a jaw of the chuck in a centered position.

Figure 12:
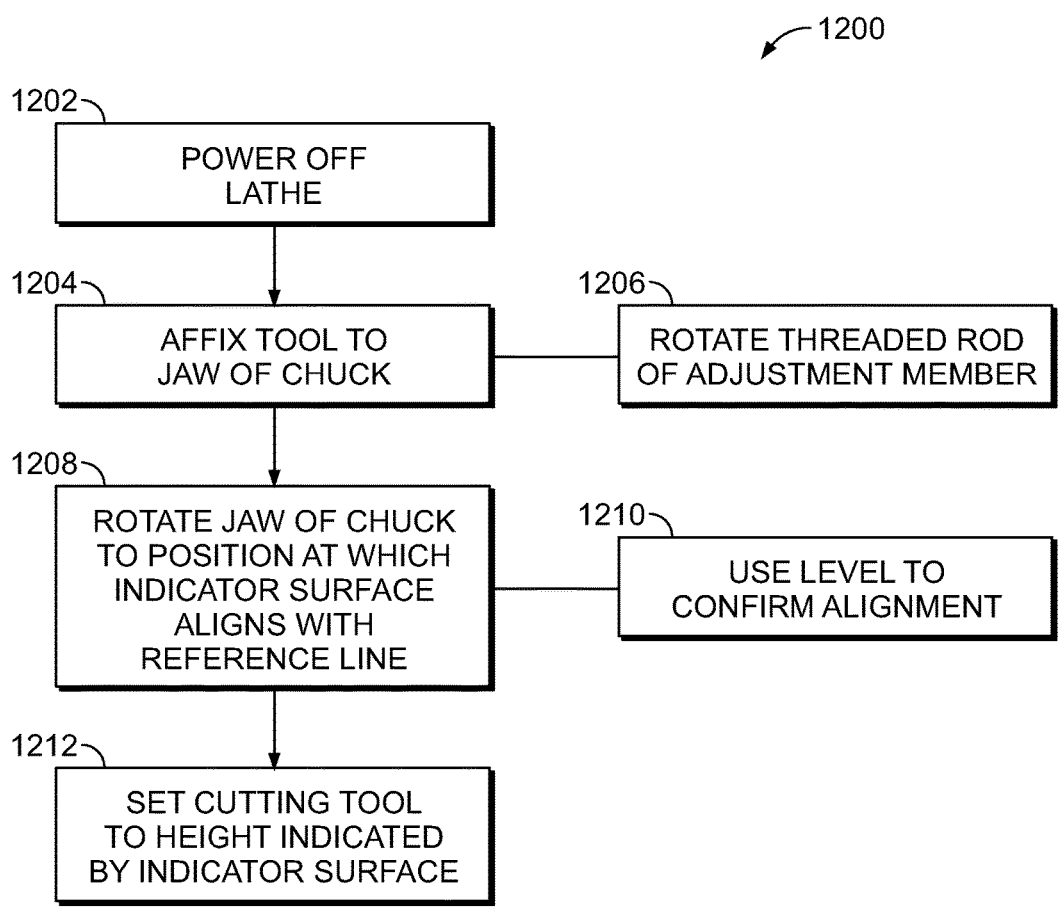
FIG. 12 provides a flowchart of a method according to an embodiment of the present disclosure.

FIG. 12 provides a flowchart of a method 1200 (e.g., for using a height-setting tool (e.g., height-setting tool 100; height-setting tool 200) to set the height of a cutting tool), in accordance with various embodiments. The method 1200, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 1202, a lathe is powered off. The lathe, for example, may be set to an "e-stop" or emergency stop position. By powering off the lathe, a height-setting tool may be secured to a jaw (101) of a chuck (102) of the lathe without the lathe inadvertently rotating.

At 1204, a tool (e.g., height-setting tool 100, height-setting tool 200) is affixed to a jaw of a chuck. The tool in various embodiments includes first and second clamping jaws that may be urged together to secure the jaw of the chuck therebetween. The first and second clamping jaws in the illustrated embodiment are coupled to an adjustment member, which is also coupled to an indicator member. For example, the adjustment member may include threaded openings configured to accept threaded portions of the adjustment member. In the depicted embodiment, at 1206, the tool is affixed to the jaw of the chuck by rotating a threaded rod of the adjustment member to cause the first and second clamping jaws to grasp the jaw of the chuck. For example, the threaded rod may have threaded portions of a similar pitch but opposite orientation (e.g., one left-hand thread and one right-hand thread), such that rotating the adjustment member in a first direction urges the first and second clamping jaws toward each other, and rotation of the adjustment member in a second direction opposite to the first direction urges the first and second clamping jaws away from each other.

At 1208, the jaw of the chuck (with the height-setting tool attached) is rotated to a position (e.g., a position at which the center line of the jaw is aligned with a center line of a lathe to which the chuck is mounted) at which an indicator surface (e.g., 142, 242) of the indicator member aligns with a reference line. The reference line for example, may be the center line (e.g., 103) of the lathe and/or chuck, and the indicator surface may be aligned with center line of the lathe with the jaw of the chuck in a centered position. In the depicted embodiment, at 1210, a level (e.g., a level mounted to one of the first or second clamping jaws of the tool) is used to confirm alignment of the jaw with the center line of the lathe. For example, when the jaw is at a position radially outward of the center of the lathe but level with the center line of the lathe, the level may provide an indication that the level position has been reached. For example, an air bubble of a bubble level may be at a central position when the jaw and height-setting tool are aligned with the center line of the lathe, and an operator may visually observe the bubble level to determine when the aligned position is reached.

At 1212, with the chuck jaw and tool aligned with the reference line (e.g., center line of the lathe), a cutting tool height is set. For example, the cutting tool height may be set to the height indicated by the indicator surface of the indicator member of the height-setting tool. In some embodiments, a cutting surface of the cutting tool may be brought into contact with the indicator surface to align the cutting surface with the center line of the lathe. It may be noted that in, some embodiments, the workpiece may be secured by the chuck, with the height-setting tool mounted radially outward of the workpiece to a jaw of the chuck, when the height of the cutting tool is set. For example, if a cutting tool is replaced during processing of a workpiece, the replacement cutting tool may be set at the same height as the previous cutting tool, helping provide consistency and continuity to the processing of the workpiece when a cutting tool is replaced. In some embodiments, the chuck may be devoid of a workpiece when the tool is affixed to the jaw of the chuck.

With the cutting tool height set, the height-setting tool may be released and removed from the jaw of the chuck, for example by rotating the adjustment member to urge the first and second clamping jaws away from each other. With the height-setting tool removed, the power for the lathe may be turned back on, and the workpiece may be machined.

Figure 13:
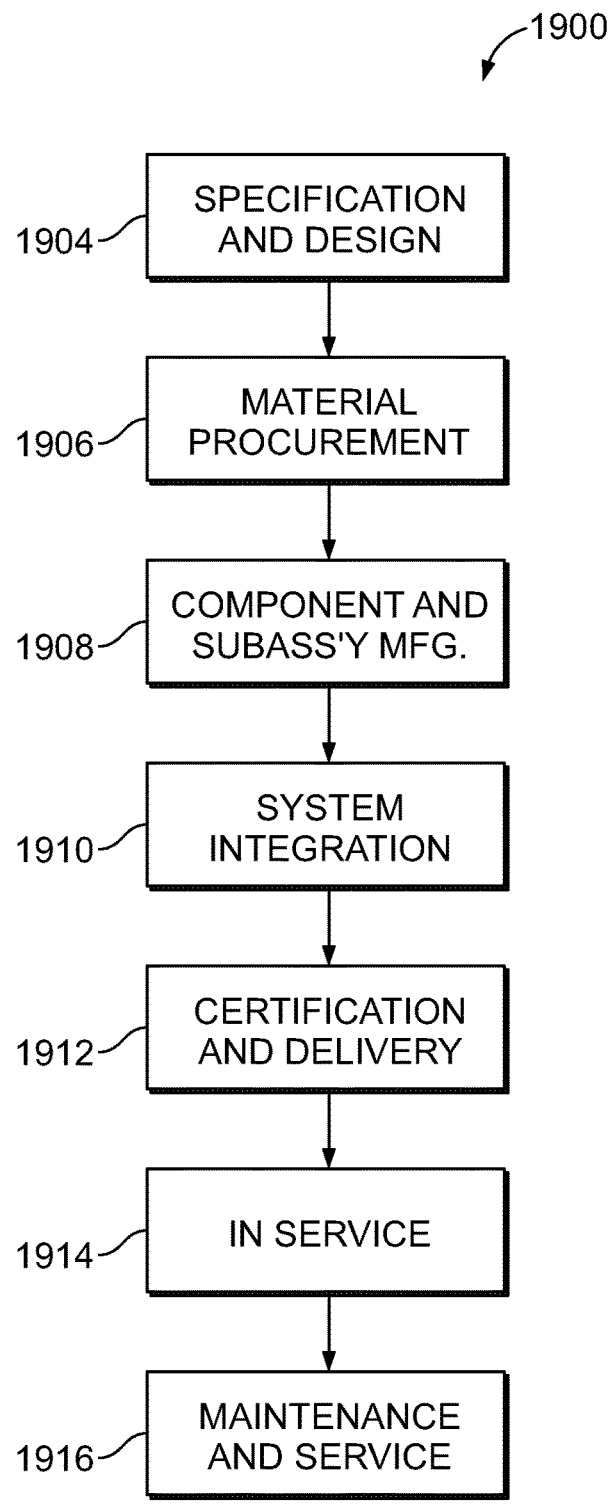
FIG. 13 is a block diagram of aircraft production and service methodology.
Figure 14:
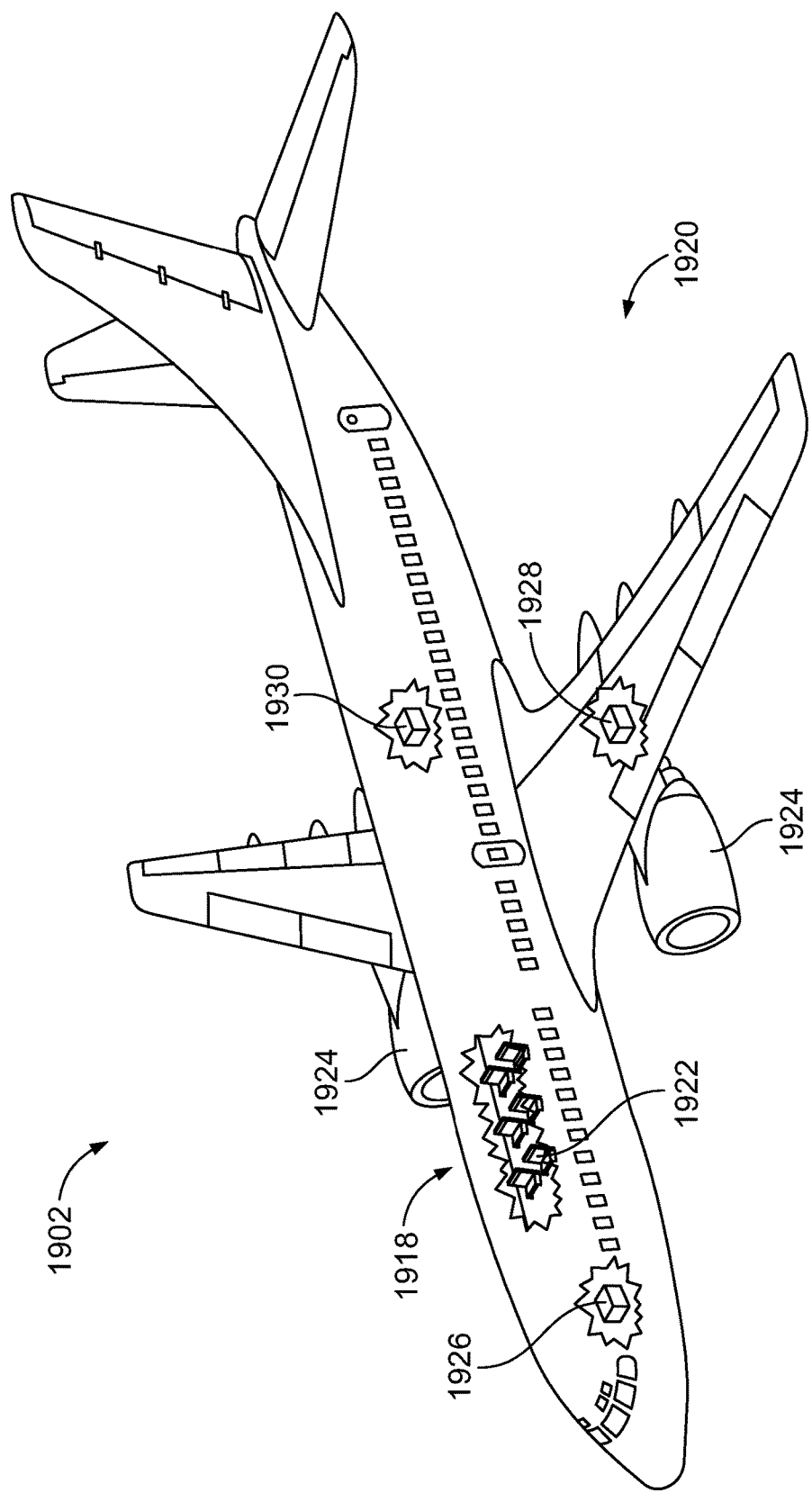
FIG. 14 is a schematic illustration of an aircraft.

Examples of the present disclosure may be described in the context of aircraft manufacturing and service method 1900 as shown in FIG. 13 and aircraft 1902 as shown in FIG. 14. During pre-production, illustrative method 1900 may include specification and design (block 1904) of aircraft 1902 and material procurement (block 1906). During production, component and subassembly manufacturing (block 1908) and system integration (block 1910) of aircraft 1902 may take place. Thereafter, aircraft 1902 may go through certification and delivery (block 1912) to be placed in service (block 1914). While in service, aircraft 1902 may be scheduled for routine maintenance and service (block 1916). Routine maintenance and service may include modification, reconfiguration, refurbishment, etc. of one or more systems of aircraft 1902. For example, in various embodiments, examples of the present disclosure may be used in conjunction with one or more of blocks 1908 or 1916.

Each of the processes of illustrative method 1900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1902 produced by illustrative method 1900 may include airframe 1918 with a plurality of high-level systems 1920 and interior 1922. Examples of high-level systems 1920 include one or more of propulsion system 1924, electrical system 1926, hydraulic system 1928, and environmental system 1930. Any number of other systems may be included. Although an aerospace example is shown, the principles disclosed herein may be applied to other industries, such as the automotive industry. Accordingly, in addition to aircraft 1902, the principles disclosed herein may apply to other vehicles, e.g., land vehicles, marine vehicles, space vehicles, etc. In various embodiments, examples of the present disclosure may be used in conjunction with one or more of airframe 1918 or interior 1922.

Apparatus(es) (e.g., 100, 200) and method(s) (1100, 1200) shown or described herein may be employed during any one or more of the stages of the manufacturing and service method 1900. For example, components or subassemblies corresponding to component and subassembly manufacturing 1908 may be fabricated or manufactured in a manner similar to components or subassemblies produced while aircraft 1902 is in service. Also, one or more examples of the apparatus(es), method(s), or combination thereof may be utilized during production stages 1908 and 1910, for example, by substantially expediting assembly of or reducing the cost of aircraft 1902. Similarly, one or more examples of the apparatus or method realizations, or a combination thereof, may be utilized, for example and without limitation, while aircraft 1902 is in service, e.g., maintenance and service stage (block 1916).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A height-setting tool comprising:
   a first clamping jaw comprising a first clamping surface;
   a second clamping jaw opposed to the first clamping jaw, the second clamping jaw comprising a second clamping surface, the first and second clamping jaws configured to grasp a jaw of a chuck;
   an adjustment member coupled to the first clamping jaw and second clamping jaw, wherein the adjustment member is configured such that a movement of the adjustment member moves the first and second clamping jaws by corresponding amounts in opposite directions; and
   an indicator member comprising an indicator surface, the indicator member coupled to the adjustment member with the indicator surface equidistant from the first and second surfaces along a clamping direction, wherein the indicator surface extends along a line disposed normal to the clamping direction about which the jaw is symmetrically disposed when the jaw is secured in the height-setting tool.

2. The tool of claim 1, wherein the adjustment member comprises a threaded rod having an intermediate portion disposed between a first threaded portion and a second threaded portion, the first threaded portion configured to be accepted by the first clamping jaw and the second threaded portion configured to be accepted by the second clamping jaw, the first and second threaded portions comprising threads that are threaded in opposite directions.

3. The tool of claim 2, further comprising a bearing, the bearing configured to accept the intermediate portion of the threaded rod, the bearing configured to be press-fit into the indicator member.

4. The tool of claim 1, further comprising guides configured to prevent the first and second clamping jaws from rotating relative to each other when the first and second clamping jaws are articulated with respect to each other via the adjustment member.

5. The tool of claim 4, wherein the guides comprise dowel pins accepted by the first and second clamping jaws.

6. The tool of claim 1, further comprising a level mounted to at least one of the first clamping jaw or the second clamping jaw, wherein the indicator surface is configured to be aligned with a center line of the chuck when the tool is mounted the jaw of the chuck and the level indicates a level state.

7. A method comprising:
   coupling a first clamping jaw and a second clamping jaw to an adjustment member, the first clamping jaw comprising a first clamping surface, the second clamping jaw opposed to the first clamping jaw, the second clamping jaw comprising a second clamping surface, the first and second clamping jaws configured to grasp a jaw of a chuck, the adjustment member coupled to the first clamping jaw and second clamping jaw, wherein a movement of the adjustment member moves the first and second clamping jaws by corresponding amounts in opposite directions;
   coupling the adjustment member to an indicator member, the indicator member comprising an indicator surface; and
   positioning the indicator surface at a predetermined relationship relative to the first and second clamping surfaces wherein the indicator surface extends along a line disposed normal to a clamping direction defined by the first clamping jaw and the second clamping jaw.

8. The method of claim 7, wherein positioning the indicator surface comprises machining the indicator surface after coupling the adjustment member to the indicator member and coupling the adjustment member to the first and second clamping jaws.

9. The method of claim 8, wherein the indicator surface is machined to be equidistant along the clamping direction from the first and second clamping surfaces.

10. The method of claim 7, wherein the adjustment member comprises a threaded rod having an intermediate portion disposed between a first threaded portion and a second threaded portion, the first and second threaded portions comprising threads that are threaded in opposite directions, wherein coupling the adjustment member to the first and second clamping jaws comprises threading the first threaded portion into the first clamping jaw, and threading the second threaded portion into the second clamping jaw.

11. The method of claim 10, wherein coupling the adjustment member to the indicator member comprises coupling the intermediate portion of the threaded rod into a bearing and press-fitting the bearing into the indicator member.

12. The method of claim 7, further comprising coupling a level to at least one of the first clamping jaw or the second clamping jaw, wherein the indicator surface is configured to be aligned with a center line of the chuck when the tool is mounted to the jaw of the chuck and the level indicates a level state.

13. The method of claim 7, further comprising coupling guides to the first and second clamping jaws, the guides configured to prevent the first and second clamping jaws from rotating relative to each other when the first and second clamping jaws are articulated with respect to each other via the adjustment member.

14. The method of claim 13, wherein the guides comprise dowel pins accepted by the first and second clamping jaws, wherein coupling the guides to the first and second clamping jaws comprises inserting the dowel pins into openings of the first and second clamping jaws.

15. A method comprising:
   affixing a tool to a jaw of a chuck, the tool comprising first and second clamping jaws configured to grasp the jaw of the chuck, the first and second clamping jaws coupled to an adjustment member, the adjustment member coupled to an indicator member;

rotating the jaw of the chuck to a position at which an indicator surface of the indicator member aligns with a reference line; and setting a cutting tool to a height indicated by the indicator surface.

16. The method of claim 15, wherein rotating the jaw of the chuck to the position comprises using a level to confirm that the indicator surface aligns with the center line of the chuck.

17. The method of claim 16, wherein the level is mounted to one of the first and second clamping jaws of the tool.

18. The method of claim 15, wherein affixing the tool to the jaw of the chuck comprises rotating a threaded rod of the adjustment member to cause the first and second clamping jaws to grasp the jaw of the chuck.

19. The method of claim 15, wherein a workpiece is secured by the chuck when the tool is affixed to the jaw of the chuck.

20. The method of claim 15, wherein the chuck is devoid of a workpiece when the tool is affixed to the jaw of the chuck.

* * * * *